(12) United States Patent
Chen (10) Patent No.: US 11,597,555 B2
(45) Date of Patent: Mar. 7, 2023

(54) DELAMINATED CONTAINER

(71) Applicant: SR PACKAGING INC., Mahe (SC)

(72) Inventor: Chia-Ching Chen, Taichung (TW)

(73) Assignee: SR PACKAGING INC., Mahe (SC)

( * ) Notice: Subject to any disclaimer, the term of this patent is extended or adjusted under 35 U.S.C. 154(b) by 0 days.

(21) Appl. No.: 17/230,980

(22) Filed: Apr. 14, 2021

(65) Prior Publication Data

US 2022/0242604 A1    Aug. 4, 2022

(30) Foreign Application Priority Data

Feb. 2, 2021   (TW) .................................. 110103739

(51) Int. Cl.
*B65D 1/02* (2006.01)
*B32B 1/02* (2006.01)

(52) U.S. Cl.
CPC .............. *B65D 1/0215* (2013.01); *B32B 1/02* (2013.01); *B65D 1/0246* (2013.01); *B32B 2439/00* (2013.01)

(58) Field of Classification Search
CPC .................................................. B65D 1/0215
USPC ....................................................... 215/12.2
See application file for complete search history.

(56) References Cited

U.S. PATENT DOCUMENTS

| | | | | |
|---|---|---|---|---|
| 4,534,930 A * | 8/1985 | Nohara | ............... | B29C 45/1684 264/513 |
| 6,129,960 A * | 10/2000 | Kudert | ................ | B29C 45/1607 220/62.12 |
| 10,202,218 B2 * | 2/2019 | Eguchi | ..................... | B65D 1/02 |
| 2004/0146675 A1 * | 7/2004 | Hashimoto | ............. | B29C 49/22 428/35.7 |
| 2007/0272650 A1 * | 11/2007 | Kishi | ................. | B65D 39/0058 215/364 |
| 2008/0012172 A1 * | 1/2008 | Merical | ............... | B29C 45/1646 264/254 |
| 2008/0185301 A1 * | 8/2008 | Merical | ................ | B65D 81/266 206/204 |
| 2015/0203235 A1 * | 7/2015 | Laib | ......................... | C03B 9/32 215/40 |

(Continued)

FOREIGN PATENT DOCUMENTS

| EP | 3205591 A1 | 8/2017 |
|---|---|---|
| EP | 3730420 A1 | 10/2020 |

(Continued)

*Primary Examiner* — Ernesto A Grano
*Assistant Examiner* — Symren K Sanghera
(74) *Attorney, Agent, or Firm* — CKC & Partners Co., LLC (57) ABSTRACT

A delaminated container has a main body portion and an opening portion. An accommodation space of the delaminated container is formed by a body inner surface of the main body portion and an opening inner surface of the opening portion. The delaminated container includes a first layer and a second layer. The first layer includes a first tightly-attached section. At the main body portion, the first layer is located closer to the body inner surface than the second layer located thereto and is exposed on the body inner surface. The second layer includes a second tightly-attached section. The first tightly-attached section and the second tightly-attached section are tightly attached to each other. The first tightly-attached section and the second tightly-attached section are both located at the opening portion of the delaminated container.

6 Claims, 11 Drawing Sheets

(56) References Cited

U.S. PATENT DOCUMENTS

| | | | |
|---|---|---|---|
| 2015/0298890 A1* | 10/2015 | Miyairi | B65D 83/0061 215/12.1 |
| 2020/0047394 A1* | 2/2020 | Chen | B29C 49/50 |
| 2020/0324931 A1* | 10/2020 | Hosokoshiyama | B65D 23/02 |
| 2020/0361651 A1* | 11/2020 | Chiba | B65D 1/0246 |

FOREIGN PATENT DOCUMENTS

| | | | |
|---|---|---|---|
| JP | H0811855 A | | 1/1996 |
| JP | 2002068229 A | | 3/2002 |
| JP | 2005008266 A | * | 1/2005 |
| JP | 2005008266 A | | 1/2005 |
| JP | 2016069038 A | | 5/2016 |
| JP | 2016104644 A | | 6/2016 |
| JP | 2016117534 A | | 6/2016 |
| JP | 2018122860 A | | 8/2018 |
| WO | 2014068876 A1 | | 5/2014 |
| WO | 2016121578 A1 | | 8/2016 |
| WO | 2017073721 A1 | | 5/2017 |

* cited by examiner

DELAMINATED CONTAINER

RELATED APPLICATIONS

This application claims priority to Taiwan Application Serial Number 110103739, filed Feb. 2, 2021, which is herein incorporated by reference.

BACKGROUND

Technical Field

The present disclosure relates to a delaminated container. More particularly, the present disclosure relates to a delaminated container having an opening portion without a tendency to be delaminated.

Description of Related Art

With the rapid developments of various techniques, the applications of the delaminated containers become more and more extensive. However, when a delaminated container is being used, an inner layer and an outer layer at a main body portion being in a delaminated state easily result in the inner layer and the outer layer at an opening portion being also delaminated. Then the inner layer and the outer layer may be totally delaminated and peeled off so as to impact the usage convenience. How to solve the said problem is also a bottleneck in a conventional manufacturing process. That is, the inner layer and the outer layer are required to be delaminated while unaffectedly unloading the content therein, but not required to be delaminated totally, and thereby there seems a conflict or a trade-off in the engineering design of the delaminated container.

Given the above, there is an urgent need in the market for a delaminated container, which is featured with effectively preventing from the total delamination between the inner layer and the outer layer, and unaffectedly unloading the content therein.

SUMMARY

According to one aspect of the present disclosure, a delaminated container has a main body portion and an opening portion. The opening portion is located closer to an opening of the delaminated container than the main body portion located thereto. An accommodation space of the delaminated container is formed by a body inner surface of the main body portion and an opening inner surface of the opening portion. The delaminated container includes a first layer and a second layer. The first layer includes a first tightly-attached section. At the main body portion, the first layer is located closer to the body inner surface than the second layer located thereto and is exposed on the body inner surface. The second layer includes a second tightly-attached section. The first tightly-attached section and the second tightly-attached section are tightly attached to each other. The first tightly-attached section and the second tightly-attached section are both located at the opening portion of the delaminated container.

According to another aspect of the present disclosure, a delaminated container has a main body portion and an opening portion. The opening portion is located closer to an opening of the delaminated container than the main body portion located thereto. An accommodation space of the delaminated container is formed by a body inner surface of the main body portion and an opening inner surface of the opening portion. The delaminated container includes a first layer and a second layer. The first layer includes a first tightly-attached section. At the main body portion, the first layer is located closer to the body inner surface than the second layer located thereto and is exposed on the body inner surface. The second layer includes a second tightly-attached section. The first tightly-attached section and the second tightly-attached section are tightly attached to each other. The first tightly-attached section and the second tightly-attached section are both located at the opening portion of the delaminated container and form an inwardly folded structure.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
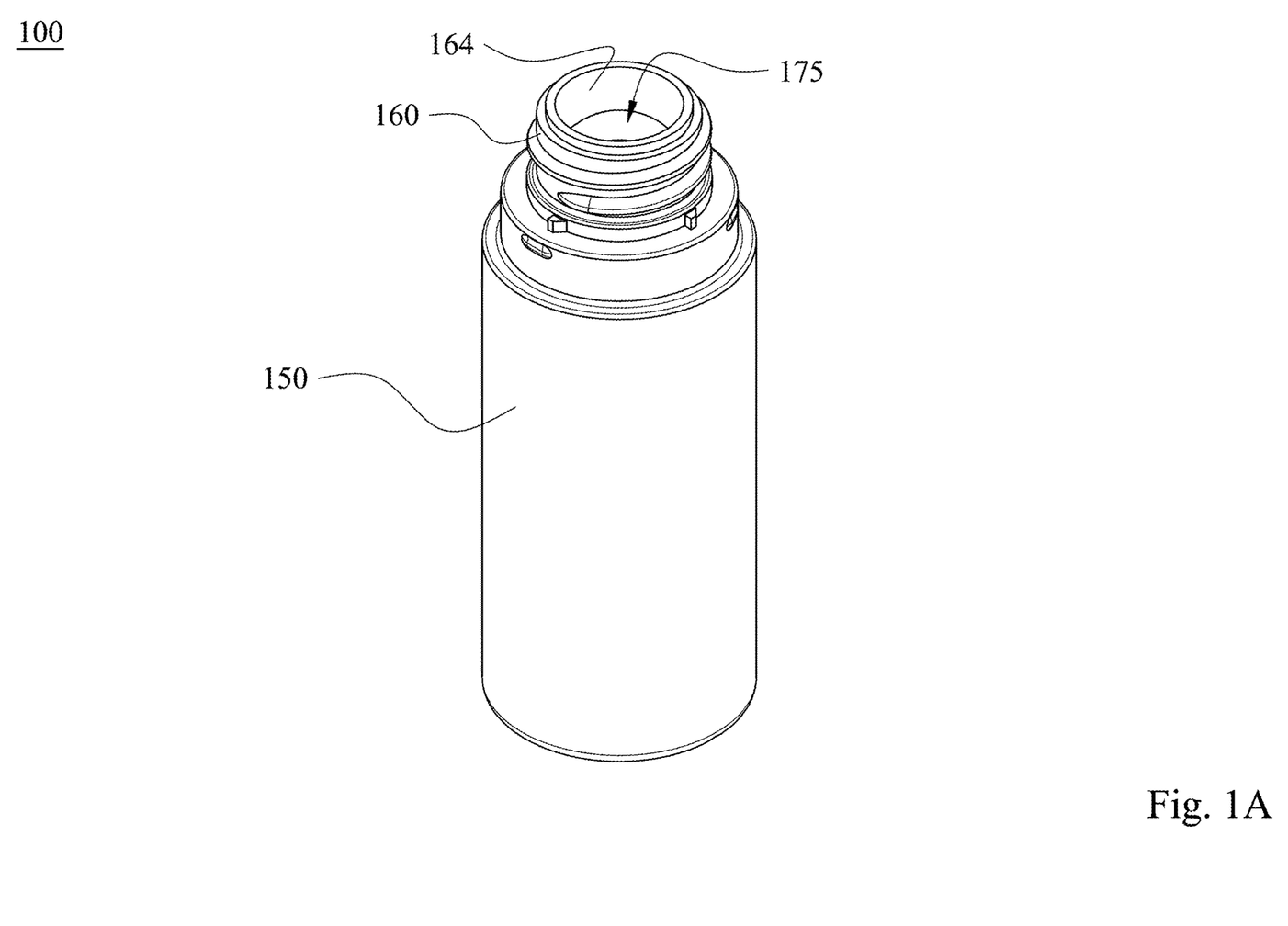
FIG. 1A is a three-dimensional view of a delaminated container according to the 1st embodiment of the present disclosure.
Figure 1B:
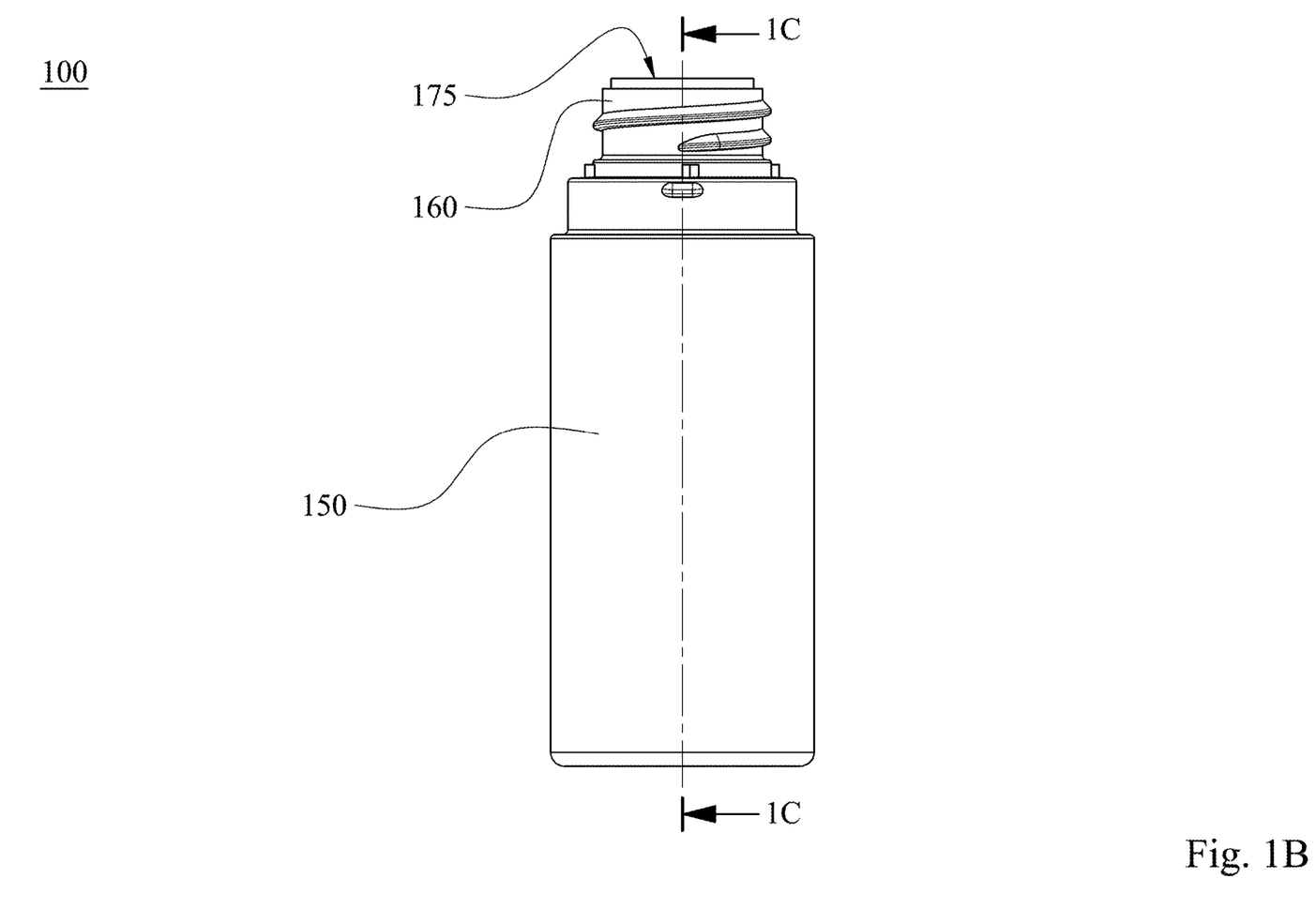
FIG. 1B is a side view of the delaminated container according to the 1st embodiment.
Figure 1C:
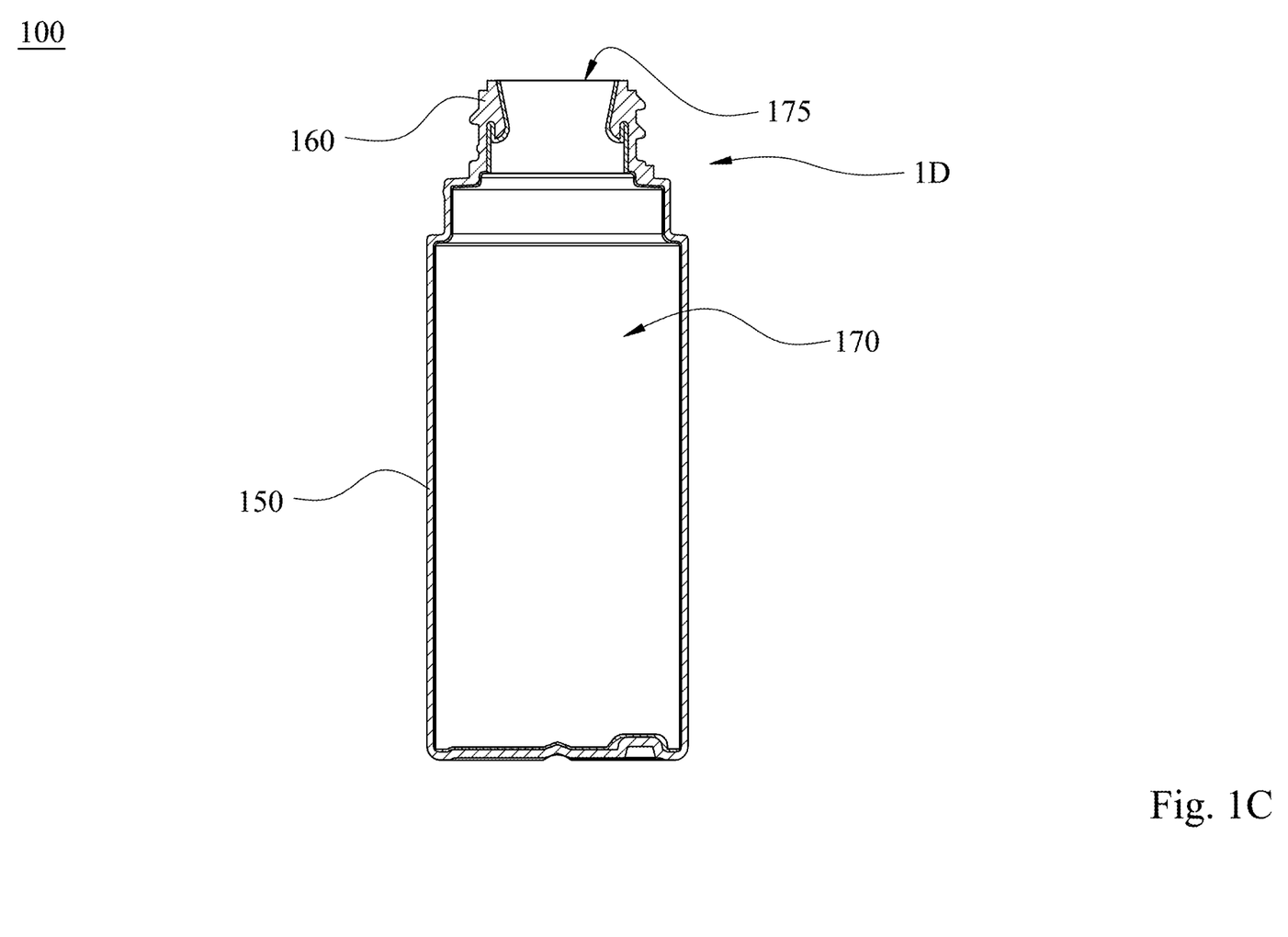
FIG. 1C is a cross-sectional view along line 1C-1C of the delaminated container in FIG. 1B.
Figure 1D:
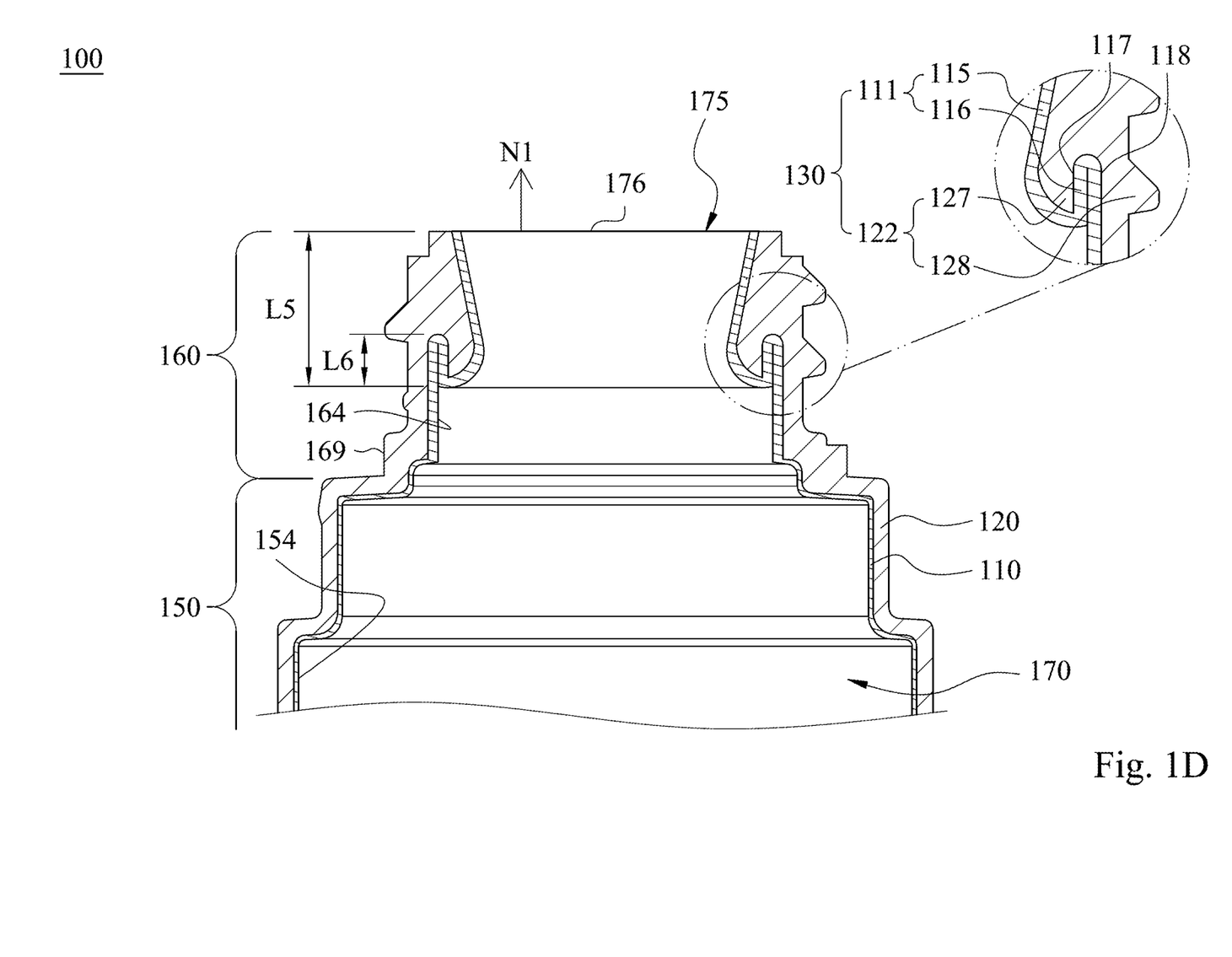
FIG. 1D is a schematic view of part 1D in FIG. 1C.

FIG. 1A is a three-dimensional view of a delaminated container 100 according to the 1st embodiment of the present disclosure. FIG. 1B is a side view of the delaminated container 100 according to the 1st embodiment. FIG. 1C is a cross-sectional view along line 1C-1C of the delaminated container 100 in FIG. 1B. FIG. 1D is a schematic view of part 1D in FIG. 1C. With reference to FIG. 1A to FIG. 1D, a delaminated container 100 has a main body portion 150 and an opening portion 160. The opening portion 160 is located closer to an opening 175 of the delaminated container 100 than the main body portion 150 located thereto (i.e., located to the opening 175). An accommodation space 170 of the delaminated container 100 is formed by a body inner surface 154 of the main body portion 150 and an opening inner surface 164 of the opening portion 160. The delaminated container 100 includes a first layer 110 and a second layer 120.

With reference to FIG. 1D, the first layer 110 includes a first tightly-attached section 111. At the main body portion 150, the first layer 110 is located closer to the body inner surface 154 than the second layer 120 located thereto (i.e., located to the body inner surface 154) and is exposed on the body inner surface 154. The second layer 120 includes a second tightly-attached section 122. The first tightly-attached section 111 and the second tightly-attached section 122 are tightly attached to each other. The first tightly-attached section 111 and the second tightly-attached section 122 are both located at the opening portion 160 of the delaminated container 100. Accordingly, it is advantageous in preventing the delamination between the first layer 110 and the second layer 120 at the opening portion 160, and unaffectedly unloading the content therein. Furthermore, for a delaminated container according to the present disclosure, a first layer indicates the innermost layer at a main body portion, a second layer indicates an outer layer, i.e., except the innermost layer, at the main body portion, and a number of the second layer may be at least two.

In detail, the first tightly-attached section 111 and the second tightly-attached section 122 are both located at the opening portion 160 of the delaminated container 100 and form an inwardly folded structure 130. Accordingly, it is advantageous in preventing the delamination between the first layer 110 and the second layer 120 at the opening portion 160, reducing the manufacturing cost, and increasing the production efficiency of the delaminated container 100.

Moreover, the inwardly folded structure 130 is formed in an original and general blow molding process to enlarge a contact area of a first layer of a blank thereof (i.e., the contact area between the first layer and a second layer of the blank), so as to increase the friction to achieve the tightly-attached and covering functions. The delaminated container 100 can be formed integrally on the blow molding equipment without an additional tool or apparatus.

Furthermore, the first tightly-attached section 111 and the second tightly-attached section 122 can be formed in the manufacturing process of the delaminated container 100. For example, the first tightly-attached section 111 and the second tightly-attached section 122 can be formed during the blowing pin entering the molten blank prior to molding of the delaminated container 100 in the manufacturing process. When the blowing pin enters the opening of the blank, the outer wall of the blowing pin and the first layer of the blank (i.e., the inner layer or the innermost layer of the blank) are attached. At least a part of the first layer of the blank is pulled inwardly by the outer wall of the blowing pin and folded inwardly along the opening inner surface (i.e., the inner surface at or near the opening), so that the first layer and the second layer (i.e., the outer layer of the blank) are tightly attached. Next, the inwardly folded structure 130 is formed by squeezed and cutting of the outer wall of the blowing pin and the mold, so that the delaminated container 100 is featured with an enlarged contact area between the first layer 110 and the second layer 120 (i.e., the inner layer and the outer layer), and the second layer 120 has the function of covering the first layer 110 at the opening portion 160 and thereby being uneasy to peel off. A thickness of the first layer 110 at the opening portion 160 may be inconsistent or uneven. When the blowing pin enters the opening of the blank, the first layer 110 is squeezed in a direction from the opening 175 toward the main body 150, and thereby the thickness of the first layer 110 becomes thicker (not shown in drawings) in the direction from the opening 175 toward the main body 150 while a shape of the opening inner surface 164 corresponding to a shape of the outer wall of the blowing pin. An outer shape and an appearance design of the delaminated container 100 can be unaffected due to only the opening inner surface 164 of the opening portion 160 is molded by the blowing pin. Alternately, a blank may be squeezed and cut at an opening by an outer wall of a blowing pin and a mold with corresponding shapes, then high-pressure air is blown into the blank, and a delaminated container is formed integrally with an individual or different shape of an opening portion.

The first tightly-attached section 111 includes a sandwiched segment 116. The second tightly-attached section 122 includes an inner tightly-attached segment 127. The sandwiched segment 116 and at least one part of the inner tightly-attached segment 127 are tightly attached to each other to increase the friction. The inner tightly-attached segment 127 is located closer to the opening inner surface 164 than the sandwiched segment 116 located thereto (i.e., located to the opening inner surface 164), and the sandwiched segment 116 is not exposed on the opening inner surface 164. Therefore, the sandwiched segment 116 of the first layer 110 is covered by the second layer 120 so as to increase the tightly attached strength. In an embodiment of the present disclosure, a delaminated container has an opening normal direction, which is a normal direction of a virtual plane formed by an opening thereof. A part of a second layer is existed in a vertical direction which is toward an opening inner surface of the said normal direction with respect to a sandwiched segment.

Moreover, the inner tightly-attached segment 127 is not exposed on the opening inner surface 164. Therefore, the first layer 110 exposed on the opening inner surface 164 is beneficial to simultaneously prevent from the delamination and reduce the manufacturing complexity.

The first tightly-attached section 111 further includes a first opening segment 115. The first opening segment 115 is tightly attached to another part of the inner tightly-attached segment 127 and exposed on the opening inner surface 164. The first opening segment 115 is extended along the direction from the opening 175 towards the main body portion 150 and connected to the sandwiched segment 116. Accordingly, in the manufacturing process of the delaminated container 100, only a part of the first layer (i.e., the second layer being excluded) of the blank is pulled inwardly by the outer wall of the blowing pin and folded inwardly along the opening inner surface so as to be tightly-attached the second layer of the blank. Thus, the first opening segment 115 of the first layer 110 of the delaminated container 100 after molding is exposed on the opening inner surface 164 at a position corresponding to the opening 175, and it is advantageous in preventing the delamination between the first layer 110 and the second layer 120 at the opening portion 160.

The delaminated container 100 has an opening normal direction N1, which is a normal direction of a virtual plane 176 formed by the opening 175. In the opening normal direction N1, a ratio of a length L6 of the sandwiched segment 116 to a length L5 of the first opening segment 115 is between 0.3 and 1 (0.3 and 1 being included). In the 1st embodiment, the length L6 is 2.4 mm, the length L5 is 6.9 mm, and the ratio of the length L6 to the length L5 is 0.35. The lengths L5 and L6 can be adjusted according to depths of the blowing pin entering the blank in the manufacturing process of the delaminated container 100. Therefore, it is beneficial to increase the tightly-attached firmness.

An inner diameter of the opening inner surface 164 becomes smaller along a direction from the opening 175 towards the main body portion 150. Accordingly, the first tightly-attached section 111 tightly-attached the second tightly-attached section 122 in a non-parallel manner is advantageous in reducing the risk of being easily peeling off or delaminated and simultaneously maintaining the convenience of manufacturing. In addition, the shape of the opening inner surface 164 can be corresponding to the shape of the outer wall of the blowing pin used in the manufacturing process of the delaminated container 100, that is, a shape of at least one part of the outer wall of the blowing pin may be narrower at a position closer to a tip of the blowing pin and wider at another position farther from the tip thereof. In other embodiment according to the present disclosure, a shape of an outer wall of the blowing pin may be in other geometric shapes.

The second tightly-attached section 122 further includes an outer tightly-attached segment 128. An inner surface 117 of the sandwiched segment 116 and the part of the inner tightly-attached segment 127 are tightly attached to each other, and an outer surface 118 of the sandwiched segment 116 and one part of the outer tightly-attached segment 128 are tightly attached to each other, so as to increase the friction. The sandwiched segment 116 is not exposed on the opening inner surface 164. Therefore, the sandwiched segment 116 of the first tightly-attached section 111 being covered inwardly and outwardly by the second layer 120 is advantageous in increasing the tightly attached strength.

Specifically, the first tightly-attached section 111 includes the first opening segment 115 and the sandwiched segment 116 in order along the direction from the opening 175 towards the main body portion 150. The second tightly-attached section 122 includes the inner tightly-attached segment 127 and the outer tightly-attached segment 128 in order along a direction from the opening inner surface 164, via the opening 175 towards an opening outer surface 169. That is, the inner tightly-attached segment 127 and the outer tightly-attached segment 128 of the second tightly-attached section 122 cover the sandwiched segment 116 of the first tightly-attached section 111, and are connected to each other near an end of the sandwiched segment 116 which is farther from the main body portion 150. The first tightly-attached section 111 and the second tightly-attached section 122 form the inwardly folded structure 130, which may be only formed by inwardly folding of the first layer of the blank of the delaminated container 100. Furthermore, the first opening segment 115 of the first tightly-attached section 111 is exposed on the opening inner surface 164, and the second tightly-attached section 122 is not exposed on the opening inner surface 164.

Figure 2:
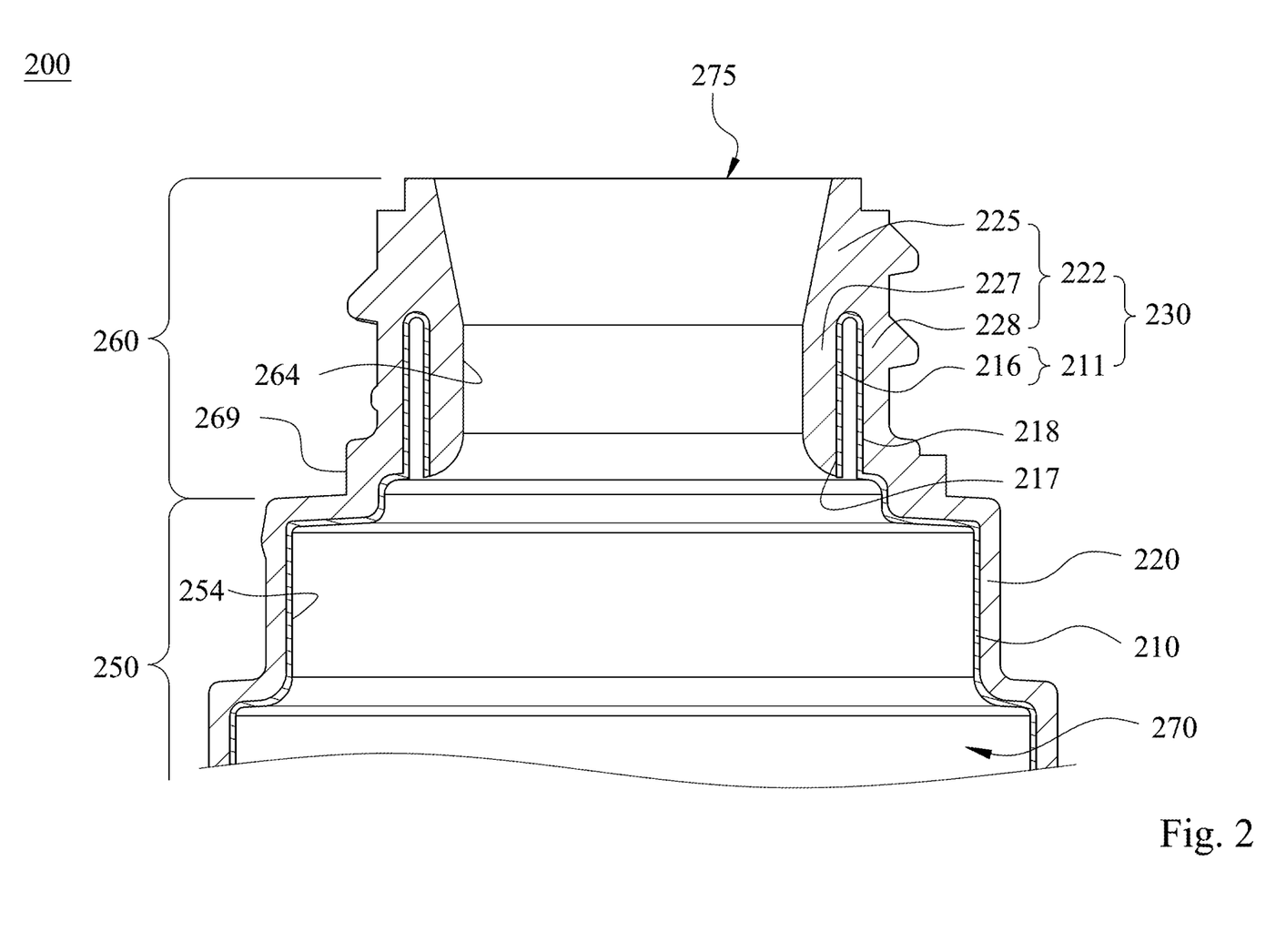
FIG. 2 is a partially cross-sectional view of a delaminated container according to the 2nd embodiment of the present disclosure.

FIG. 2 is a partially cross-sectional view of a delaminated container 200 according to the 2nd embodiment of the present disclosure. With reference to FIG. 2, a delaminated container 200 has a main body portion 250 and an opening portion 260. The opening portion 260 is located closer to an opening 275 of the delaminated container 200 than the main body portion 250 located thereto. An accommodation space 270 of the delaminated container 200 is formed by a body inner surface 254 of the main body portion 250 and an opening inner surface 264 of the opening portion 260. The delaminated container 200 includes a first layer 210 and a second layer 220. The first layer 210 includes a first tightly-attached section 211. At the main body portion 250, the first layer 210 is located closer to the body inner surface 254 than the second layer 220 located thereto and is exposed on the body inner surface 254. The second layer 220 includes a second tightly-attached section 222. The first tightly-attached section 211 and the second tightly-attached section 222 are tightly attached to each other. The first tightly-attached section 211 and the second tightly-attached section 222 are both located at the opening portion 260 of the delaminated container 200 and form an inwardly folded structure 230.

The first tightly-attached section 211 includes a sandwiched segment 216. The second tightly-attached section 222 includes an inner tightly-attached segment 227 and an outer tightly-attached segment 228. An inner surface 217 of the sandwiched segment 216 and the inner tightly-attached segment 227 are tightly attached to each other. An outer surface 218 of the sandwiched segment 216 and the outer tightly-attached segment 228 are tightly attached to each other. There may be an air gap (reference number omitted) existed in or not in the sandwiched segment 216. The inner tightly-attached segment 227 is located closer to the opening inner surface 264 than the sandwiched segment 216 located thereto and is exposed on the opening inner surface 264, and the sandwiched segment 216 is not exposed on the opening inner surface 264. Furthermore, an inner diameter of the opening inner surface 264 becomes smaller along a direction from the opening 275 towards the main body portion 250.

The second tightly-attached section 222 further includes a second opening segment 225. The second opening segment 225 is exposed on the opening inner surface 264 and extended along the direction from the opening 275 towards the main body portion 250. Accordingly, in the manufacturing process of the delaminated container 200, a part of a first layer and a part of a second layer of a blank of the delaminated container 200 are pulled inwardly together by an outer wall of a blowing pin and folded inwardly along an opening inner surface (i.e., an inner surface at or near an opening of the blank), so that the first layer and the second layer of the blank (i.e., an inner layer and an outer layer of the blank) are tightly attached to enlarge the contact area and the friction therebetween. Thus, the second layer 220 of the delaminated container 200 after molding is exposed on the opening inner surface 264 at a position of the opening 275, and the first layer 210 and the second layer 220 are uneasy to peel off at the opening portion 260.

Furthermore, the sandwiched segment 216 and the inner tightly-attached segment 227 are tightly attached to each other, and the sandwiched segment 216 is not exposed on the opening inner surface 264. The second opening segment 225 is connected to the inner tightly-attached segment 227. Therefore, it is beneficial to implement the inwardly folded structure 230, which is formed by the first layer and the second layer folded inwardly together of the blank of the delaminated container 200.

Specifically, the second tightly-attached section 222 includes the inner tightly-attached segment 227, the second opening segment 225 and the outer tightly-attached segment 228 in order along a direction from the opening inner surface 264, via the opening 275 towards an opening outer surface 269. That is, the inner tightly-attached segment 227, the second opening segment 225 and the outer tightly-attached segment 228 of the second tightly-attached section 222 cover inwardly and outwardly the sandwiched segment 216 of the first tightly-attached section 211, and are connected near an end of the sandwiched segment 216 which is farther from the main body portion 250. The first tightly-attached section 211 and the second tightly-attached section 222 form the inwardly folded structure 230, which may be formed by inwardly folding together of the first layer and the second layer of the blank of the delaminated container 200. Furthermore, the second opening segment 225, the inner tightly-attached segment 227 of the second tightly-attached section 222 and the first tightly-attached section 211 are exposed on the opening inner surface 264 in order along the direction from the opening 275 towards the main body portion 250.

Figure 3:
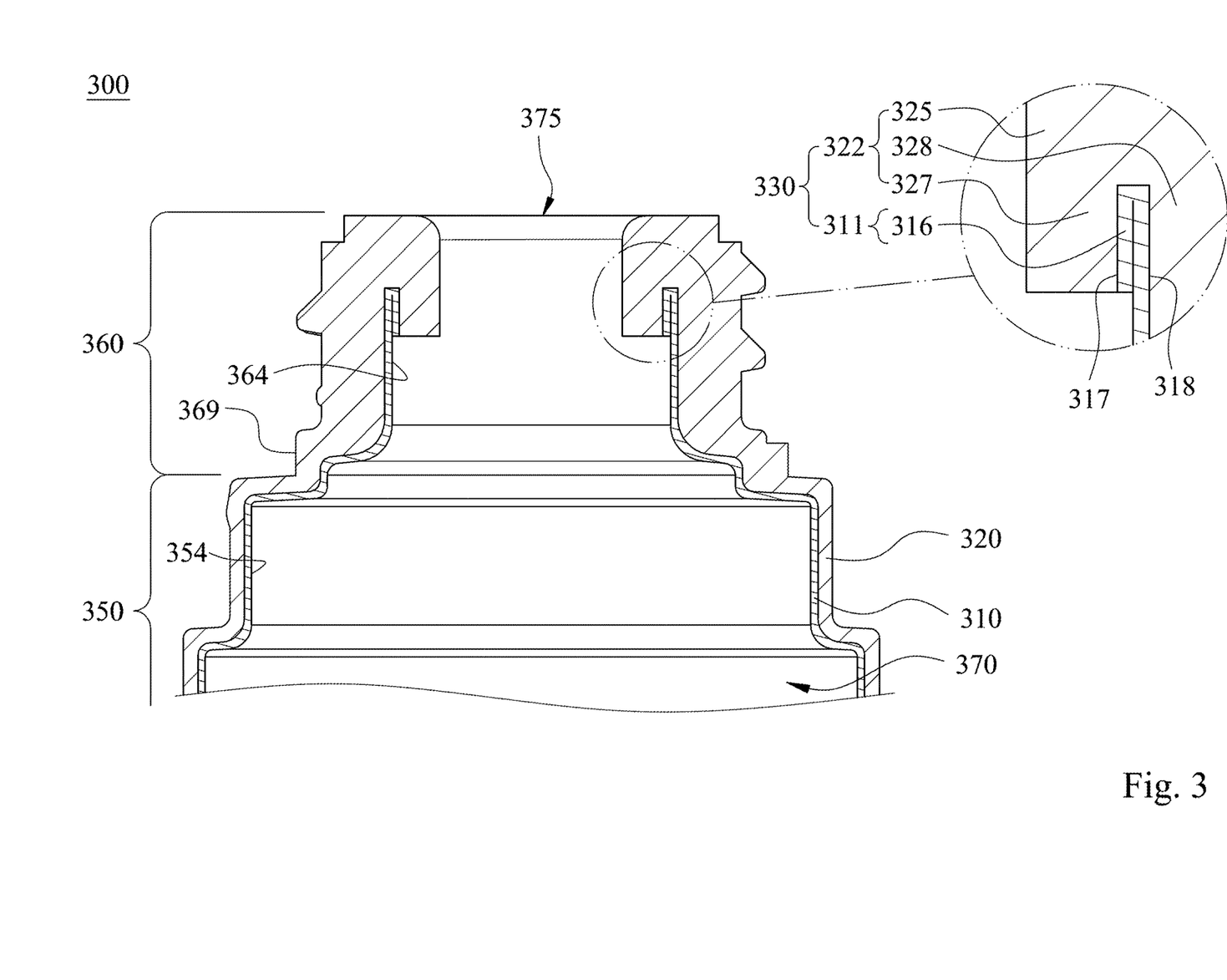
FIG. 3 is a partially cross-sectional view of a delaminated container according to the 3rd embodiment of the present disclosure.

FIG. 3 is a partially cross-sectional view of a delaminated container 300 according to the 3rd embodiment of the present disclosure. With reference to FIG. 3, a delaminated container 300 has a main body portion 350 and an opening portion 360. The opening portion 360 is located closer to an opening 375 of the delaminated container 300 than the main body portion 350 located thereto. An accommodation space 370 of the delaminated container 300 is formed by a body inner surface 354 of the main body portion 350 and an opening inner surface 364 of the opening portion 360. The delaminated container 300 includes a first layer 310 and a second layer 320. The first layer 310 includes a first tightly-attached section 311. At the main body portion 350, the first layer 310 is located closer to the body inner surface 354 than the second layer 320 located thereto and is exposed on the body inner surface 354. The second layer 320 includes a second tightly-attached section 322. The first tightly-attached section 311 and the second tightly-attached section 322 are tightly attached to each other. The first tightly-attached section 311 and the second tightly-attached section 322 are both located at the opening portion 360 of the delaminated container 300 and form an inwardly folded structure 330.

The first tightly-attached section 311 includes a sandwiched segment 316. The second tightly-attached section 322 includes an inner tightly-attached segment 327 and an outer tightly-attached segment 328. An inner surface 317 of the sandwiched segment 316 and the inner tightly-attached segment 327 are tightly attached to each other. An outer surface 318 of the sandwiched segment 316 and the outer tightly-attached segment 328 are tightly attached to each other. The inner tightly-attached segment 327 is located closer to the opening inner surface 364 than the sandwiched segment 316 located thereto and is exposed on the opening inner surface 364, and the sandwiched segment 316 is not exposed on the opening inner surface 364. Furthermore, an inner diameter of the opening inner surface 364 becomes smaller along a direction from the opening 375 towards the main body portion 350.

The second tightly-attached section 322 further includes a second opening segment 325. The second opening segment 325 is exposed on the opening inner surface 364 and extended along the direction from the opening 375 towards the main body portion 350. The second opening segment 325 is connected to the inner tightly-attached segment 327.

Specifically, the second tightly-attached section 322 includes the inner tightly-attached segment 327, the second opening segment 325 and the outer tightly-attached segment 328 in order along a direction from the opening inner surface 364, via the opening 375 towards an opening outer surface 369. That is, the inner tightly-attached segment 327, the second opening segment 325 and the outer tightly-attached segment 328 of the second tightly-attached section 322 cover inwardly and outwardly the sandwiched segment 316 of the first tightly-attached section 311, and are connected near an end of the sandwiched segment 316 which is farther from the main body portion 350. The first tightly-attached section 311 and the second tightly-attached section 322 form the inwardly folded structure 330, which may be formed by inwardly folding together of a first layer and a second layer of a blank of the delaminated container 300. Furthermore, the second opening segment 325, the inner tightly-attached segment 327 of the second tightly-attached section 322 and the first tightly-attached section 311 are exposed on the opening inner surface 364 in order along the direction from the opening 375 towards the main body portion 350.

Figure 4:
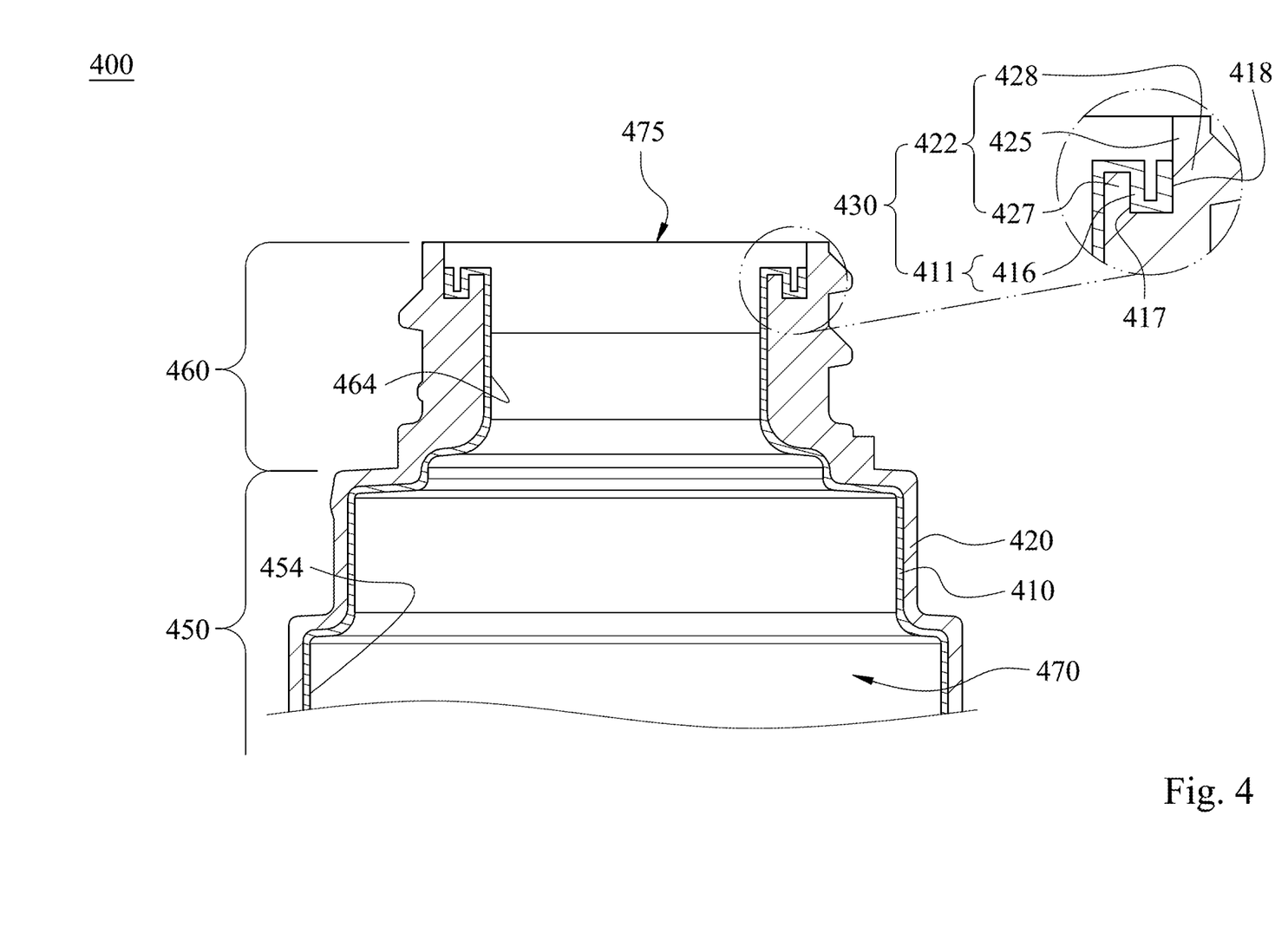
FIG. 4 is a partially cross-sectional view of a delaminated container according to the 4th embodiment of the present disclosure.

FIG. 4 is a partially cross-sectional view of a delaminated container 400 according to the 4th embodiment of the present disclosure. With reference to FIG. 4, a delaminated container 400 has a main body portion 450 and an opening portion 460. The opening portion 460 is located closer to an opening 475 of the delaminated container 400 than the main body portion 450 located thereto. An accommodation space 470 of the delaminated container 400 is formed by a body inner surface 454 of the main body portion 450 and an opening inner surface 464 of the opening portion 460. The delaminated container 400 includes a first layer 410 and a second layer 420. The first layer 410 includes a first tightly-attached section 411. At the main body portion 450, the first layer 410 is located closer to the body inner surface 454 than the second layer 420 located thereto and is exposed on the body inner surface 454. The second layer 420 includes a second tightly-attached section 422. The first tightly-attached section 411 and the second tightly-attached section 422 are tightly attached to each other. The first tightly-attached section 411 and the second tightly-attached section 422 are both located at the opening portion 460 of the delaminated container 400 and form an inwardly folded structure 430.

The first tightly-attached section 411 includes a sandwiched segment 416. The second tightly-attached section 422 includes an inner tightly-attached segment 427 and an outer tightly-attached segment 428. An inner surface 417 of the sandwiched segment 416 and the inner tightly-attached segment 427 are tightly attached to each other. An outer surface 418 of the sandwiched segment 416 and the outer tightly-attached segment 428 are tightly attached to each other. Thus, the first tightly-attached section 411 (i.e., the sandwiched segment 416 thereof) and the second tightly-attached section 422 (i.e., the inner tightly-attached segment 427 and the outer tightly-attached segment 428 thereof) can have larger contact area so as to increase the friction. There may be an air gap (reference number omitted) existed in or not in the sandwiched segment 416. The sandwiched segment 416 is exposed on the opening inner surface 464, and the inner tightly-attached segment 427 and the outer tightly-attached segment 428 are not exposed on the opening inner surface 464. Furthermore, an inner diameter of a position closer to the opening 475 of the opening inner surface 464 is greater than an inner diameter of a position farther from the opening 475 of the opening inner surface 464.

The second tightly-attached section 422 further includes a second opening segment 425. The second opening segment 425 is exposed on the opening inner surface 464 and extended along the direction from the opening 475 towards the main body portion 450. The second opening segment 425 is connected to the outer tightly-attached segment 428.

Specifically, the outer tightly-attached segment 428 and the inner tightly-attached segment 427 of the second tightly-attached section 422 cover inwardly and outwardly the sandwiched segment 416 of the first tightly-attached section 411, and are connected near an end of the sandwiched segment 416 which is closer to the main body portion 450. The first tightly-attached section 411 and the second tightly-attached section 422 form the inwardly folded structure 430, which may be only formed by inwardly folding of a first layer of a blank of the delaminated container 400. Furthermore, the second opening segment 425 of the second tightly-attached section 422 and the sandwiched segment 416 of the first tightly-attached section 411 are exposed on the opening inner surface 464 in order along the direction from the opening 475 towards the main body portion 450.

Figure 5:
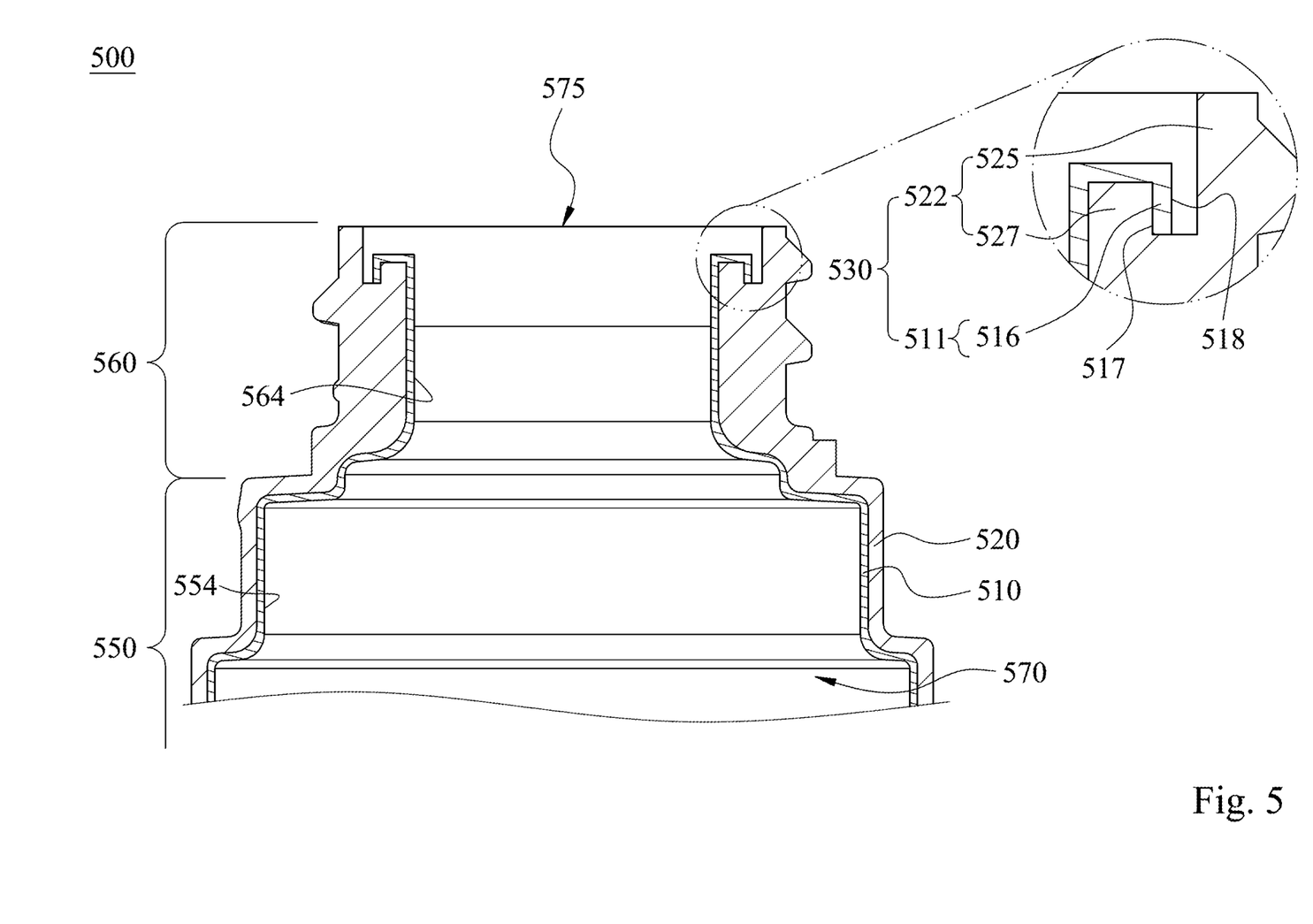
FIG. 5 is a partially cross-sectional view of a delaminated container according to the 5th embodiment of the present disclosure.

FIG. 5 is a partially cross-sectional view of a delaminated container 500 according to the 5th embodiment of the present disclosure. With reference to FIG. 5, a delaminated container 500 has a main body portion 550 and an opening portion 560. The opening portion 560 is located closer to an opening 575 of the delaminated container 500 than the main body portion 550 located thereto. An accommodation space 570 of the delaminated container 500 is formed by a body inner surface 554 of the main body portion 550 and an opening inner surface 564 of the opening portion 560. The delaminated container 500 includes a first layer 510 and a second layer 520. The first layer 510 includes a first tightly-attached section 511. At the main body portion 550, the first layer 510 is located closer to the body inner surface 554 than the second layer 520 located thereto and is exposed on the body inner surface 554. The second layer 520 includes a second tightly-attached section 522. The first tightly-attached section 511 and the second tightly-attached section 522 are tightly attached to each other. The first tightly-attached section 511 and the second tightly-attached section 522 are both located at the opening portion 560 of the delaminated container 500 and form an inwardly folded structure 530.

The first tightly-attached section 511 includes a sandwiched segment 516. The second tightly-attached section 522 includes an inner tightly-attached segment 527. An inner surface 517 of the sandwiched segment 516 and the inner tightly-attached segment 527 are tightly attached to each other. An outer surface 518 of the sandwiched segment 516 and the second tightly-attached section 522 may have an air gap (reference number omitted) existed therebetween, or may be tightly attached to each other. The sandwiched segment 516 is exposed on the opening inner surface 564, and the inner tightly-attached segment 527 is not exposed on the opening inner surface 564. Furthermore, an inner diameter of a position closer to the opening 575 of the opening inner surface 564 is greater than an inner diameter of a position farther from the opening 575 of the opening inner surface 564.

The second tightly-attached section 522 further includes a second opening segment 525. The second opening segment 525 is exposed on the opening inner surface 564 and extended along the direction from the opening 575 towards the main body portion 550. The second opening segment 525 is connected to the inner tightly-attached segment 527.

Specifically, the first tightly-attached section 511 and the second tightly-attached section 522 form the inwardly folded structure 530, which may be only formed by inwardly folding of a first layer of a blank of the delaminated container 500. The second opening segment 525 of the second tightly-attached section 522 and the sandwiched segment 516 of the first tightly-attached section 511 are exposed on the opening inner surface 564 in order along the direction from the opening 575 towards the main body portion 550.

Figure 6:
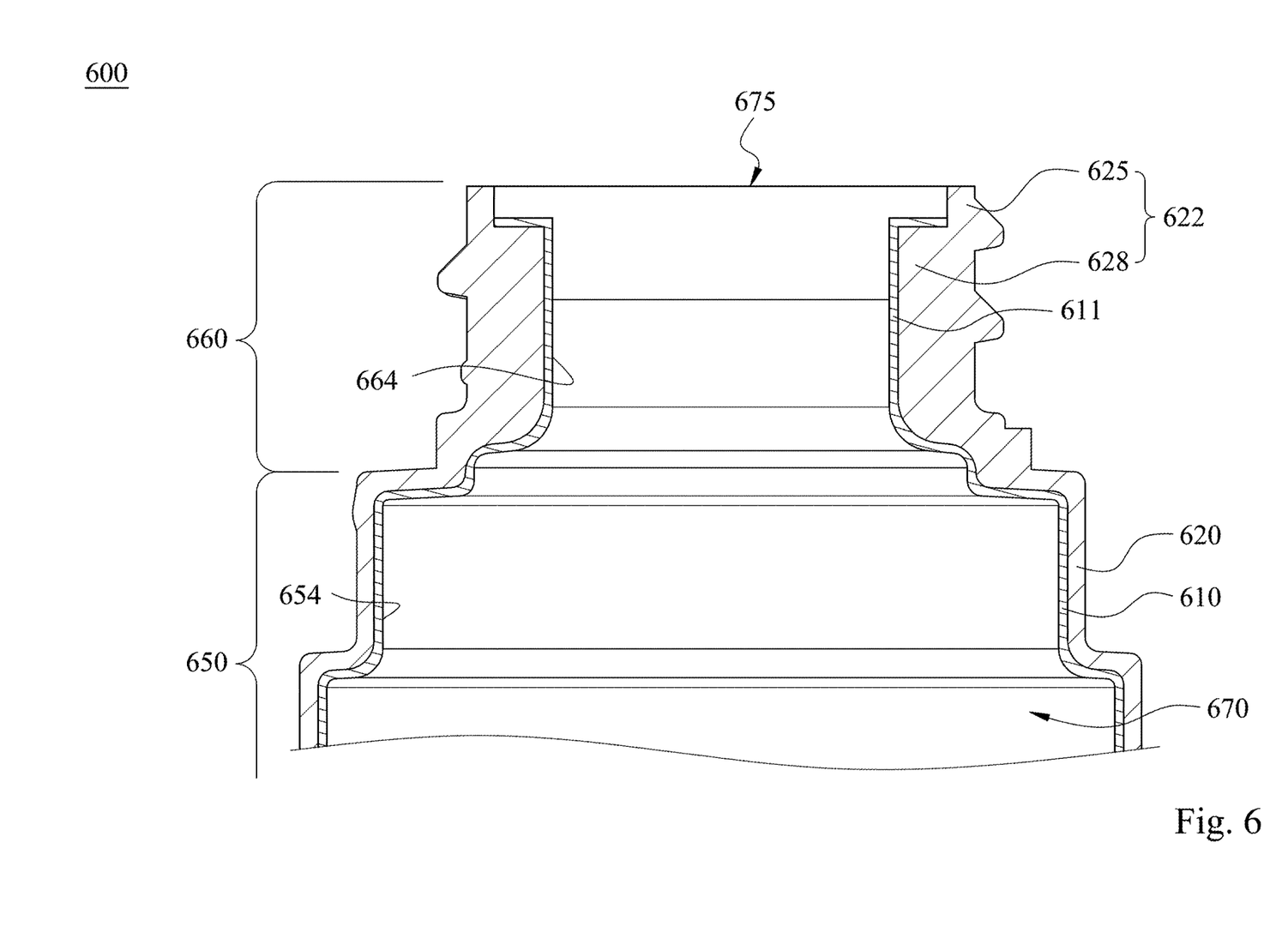
FIG. 6 is a partially cross-sectional view of a delaminated container according to the 6th embodiment of the present disclosure.
Figure 7:
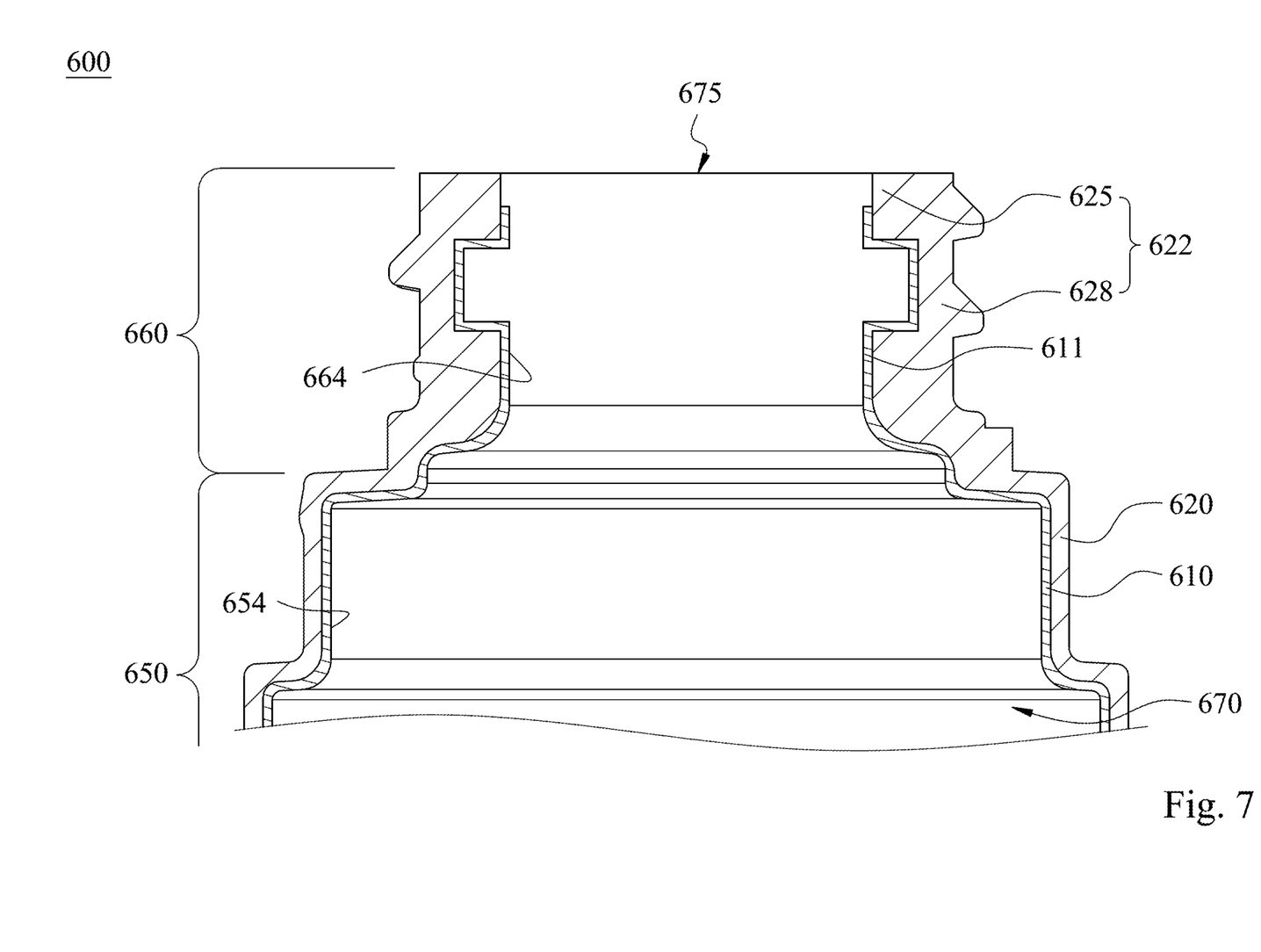
FIG. 7 is a partially cross-sectional view of a delaminated container according to the 7th embodiment of the present disclosure.
Figure 8:
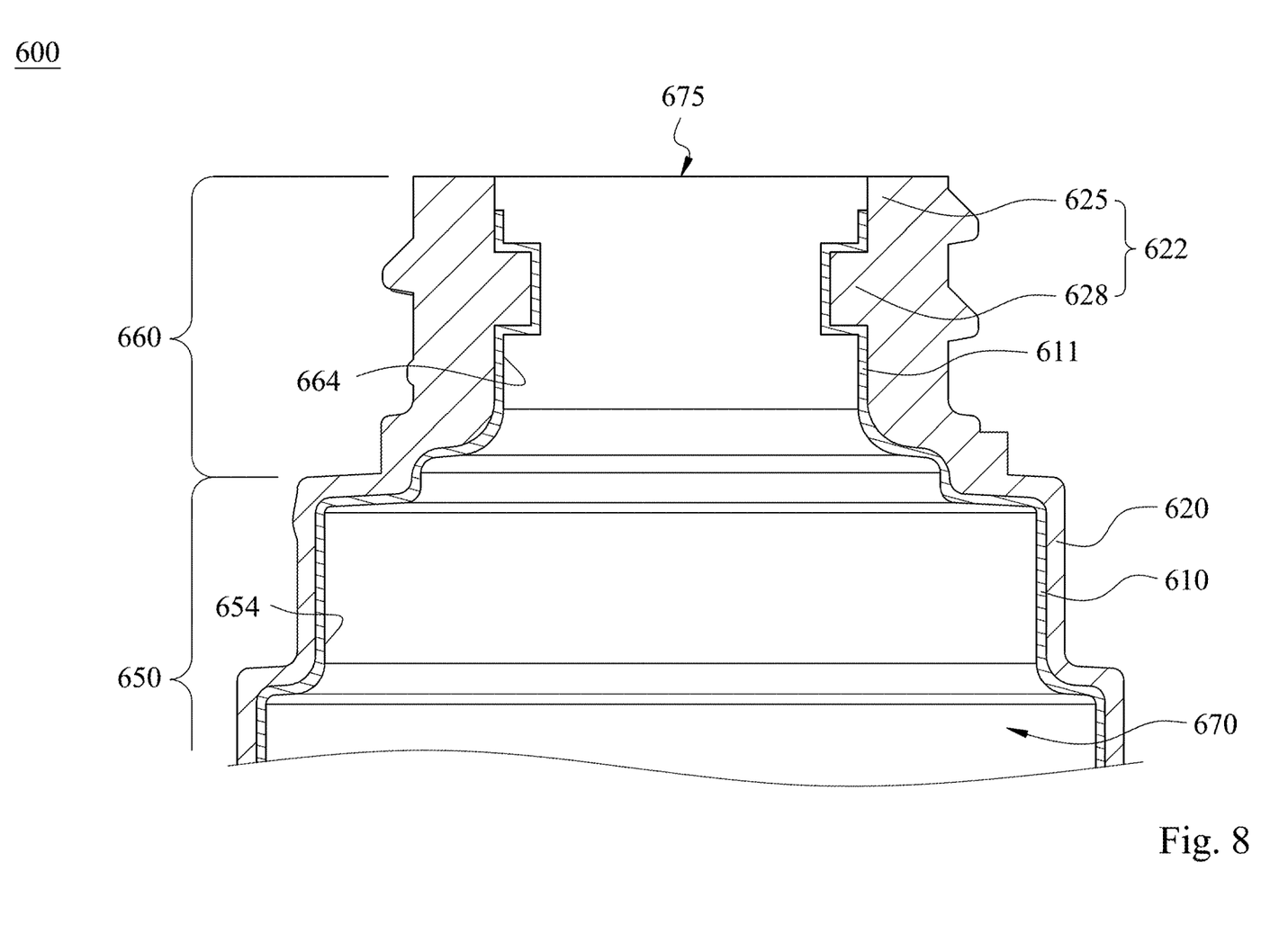
FIG. 8 is a partially cross-sectional view of a delaminated container according to the 8th embodiment of the present disclosure.

FIG. 6, FIG. 7 and FIG. 8 are partially cross-sectional views of delaminated containers 600 according to the 6th, 7th and 8th embodiments, respectively, of the present disclosure. With reference to each of FIG. 6 to FIG. 8, a delaminated container 600 has a main body portion 650 and an opening portion 660. The opening portion 660 is located closer to an opening 675 of the delaminated container 600 than the main body portion 650 located thereto. An accommodation space 670 of the delaminated container 600 is formed by a body inner surface 654 of the main body portion 650 and an opening inner surface 664 of the opening portion 660. The delaminated container 600 includes a first layer 610 and a second layer 620. The first layer 610 includes a first tightly-attached section 611. At the main body portion 650, the first layer 610 is located closer to the body inner surface 654 than the second layer 620 located thereto and is exposed on the body inner surface 654. The second layer 620 includes a second tightly-attached section 622. The first tightly-attached section 611 and the second tightly-attached section 622 are tightly attached to each other. The first tightly-attached section 611 and the second tightly-attached section 622 are both located at the opening portion 660 of the delaminated container 600.

Specifically, the second tightly-attached section 622 includes the second opening segment 625 and the outer tightly-attached segment 628. The second opening segment 625 is exposed on the opening inner surface 664 and extended along a direction from the opening 675 towards the main body portion 650. The second opening segment 625 is connected to the outer tightly-attached segment 628, which is not exposed on the opening inner surface 664. The first tightly-attached section 611 and the outer tightly-attached segment 628 are tightly attached to each other. Furthermore, the second opening segment 625 of the second tightly-attached section 622 and the first tightly-attached section 611 are exposed on the opening inner surface 664 in order along the direction from the opening 675 towards the main body portion 650. An inner diameter of a position closer to the opening 675 of the opening inner surface 664 is greater than an inner diameter of a position farther from the opening 675 of the opening inner surface 664.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A delaminated container, having a main body portion and an opening portion, wherein the opening portion is located closer to an opening of the delaminated container than the main body portion located thereto, an accommodation space of the delaminated container is formed by a body inner surface of the main body portion and an opening inner surface of the opening portion, and the delaminated container comprises:
    a first layer comprising a first tightly-attached section; and
    a second layer, wherein at the main body portion, the first layer is located closer to the body inner surface than the second layer located thereto and is exposed on the body inner surface, the second layer comprises a second tightly-attached section, and the first tightly-attached section and the second tightly-attached section are tightly attached to each other;

wherein the first tightly-attached section and the second tightly-attached section are both located at the opening portion of the delaminated container;

wherein the second tightly-attached section comprises a second opening segment, and the second opening segment is exposed on the opening inner surface and extended along a direction from the opening towards the main body portion;

wherein the first tightly-attached section comprises a sandwiched segment, the second tightly-attached section further comprises an inner tightly-attached segment, the sandwiched segment and at least one part of the inner tightly-attached segment are tightly attached to each other, the sandwiched segment is not exposed on the opening inner surface, and the second opening segment is connected to the inner tightly-attached segment.

2. The delaminated container of claim 1, wherein the inner tightly-attached segment is located closer to the opening inner surface than the sandwiched segment located thereto.

3. The delaminated container of claim 2, wherein the inner tightly-attached segment is not exposed on the opening inner surface.

4. The delaminated container of claim 1, wherein an inner diameter of the opening inner surface becomes smaller along a direction from the opening towards the main body portion.

5. A delaminated container, having a main body portion and an opening portion, wherein the opening portion is located closer to an opening of the delaminated container than the main body portion located thereto, an accommodation space of the delaminated container is formed by a body inner surface of the main body portion and an opening inner surface of the opening portion, and the delaminated container comprises:

a first layer comprising a first tightly-attached section; and a second layer, wherein at the main body portion, the first layer is located closer to the body inner surface than the second layer located thereto and is exposed on the body inner surface, the second layer comprises a second tightly-attached section, and the first tightly-attached section and the second tightly-attached section are tightly attached to each other;

wherein the first tightly-attached section and the second tightly-attached section are both located at the opening portion of the delaminated container and form an inwardly folded structure;

wherein the second tightly-attached section comprises a second opening segment, and the second opening segment is exposed on the opening inner surface and extended along a direction from the opening towards the main body portion;

wherein the first tightly-attached section comprises a sandwiched segment, the second tightly-attached section further comprises an inner tightly-attached segment, the sandwiched segment and at least one part of the inner tightly-attached segment are tightly attached to each other, the sandwiched segment is not exposed on the opening inner surface, and the second opening segment is connected to the inner tightly-attached segment.

6. The delaminated container of claim 5, wherein the second tightly-attached section further comprises an outer tightly-attached segment, an inner surface of the sandwiched segment and at least one part of the inner tightly-attached segment are tightly attached to each other, and an outer surface of the sandwiched segment and at least one part of the outer tightly-attached segment are tightly attached to each other.

* * * * *